(12) United States Patent
Chou

(10) Patent No.: US 11,910,391 B2
(45) Date of Patent: Feb. 20, 2024

(54) METHODS AND APPARATUS FOR AN UPLINK CONTROL CHANNEL IN NOMA ASYNCHRONOUS TRANSMISSIONS

(71) Applicant: Google LLC, Mountain View, CA (US)

(72) Inventor: Kao-Peng Chou, Taipei (TW)

(73) Assignee: Google LLC, Mountain View, CA (US)

( * ) Notice: Subject to any disclaimer, the term of this patent is extended or adjusted under 35 U.S.C. 154(b) by 490 days.

(21) Appl. No.: 17/265,170

(22) PCT Filed: Aug. 6, 2019

(86) PCT No.: PCT/US2019/045346
§ 371 (c)(1),
(2) Date: Feb. 1, 2021

(87) PCT Pub. No.: WO2020/033434
PCT Pub. Date: Feb. 13, 2020

(65) Prior Publication Data
US 2021/0307003 A1    Sep. 30, 2021

Related U.S. Application Data

(60) Provisional application No. 62/717,189, filed on Aug. 10, 2018.

(51) Int. Cl.
*H04W 72/21* (2023.01)
*H04L 5/00* (2006.01)
(Continued)

(52) U.S. Cl.
CPC ........... *H04W 72/21* (2023.01); *H04L 5/0037* (2013.01); *H04L 5/0048* (2013.01); *H04W 8/22* (2013.01);
(Continued)

(58) Field of Classification Search
CPC ..... H04W 72/21; H04W 72/044; H04W 8/22; H04W 74/0833; H04W 74/08;
(Continued)

(56) References Cited

U.S. PATENT DOCUMENTS 9,131,457 B2    9/2015    Nam et al.
9,712,272 B2    7/2017    Zhu et al.
(Continued)

FOREIGN PATENT DOCUMENTS

CA    3106585 A1  *  1/2020    .......... H04J 11/0069
CN    104205717    12/2014
(Continued)

OTHER PUBLICATIONS

"Corrected Notice of Allowance", U.S. Appl. No. 16/387,000, dated Jun. 17, 2021, 2 pages.
(Continued)

*Primary Examiner* — Jianye Wu
(74) *Attorney, Agent, or Firm* — Colby Nipper PLLC

(57) ABSTRACT

Techniques for implementing an uplink control channel in Non-Orthogonal Multiple Access (NOMA) asynchronous transmissions are disclosed. The techniques described herein provide an additional control channel in NOMA transmissions for a user equipment (UE) (102) to indicate certain information to a base station (106) to enable the base station (106) to detect and decode the data transmitted by the UE (102). For example, uplink control information (UCI) is transmitted (406) via an uplink control channel in connection with a group user equipment identifier (group UE-ID) to enable the base station (106) to detect and decode the UCI. After decoding (506) the UCI based on the group UE-ID, the base station (106) obtains information usable to distinguish (508) the UE (102), such as a UE-specific ID, as well as to
(Continued)

detect (510) and decode (512) a data transmission from the UE (102) on an uplink data channel.

20 Claims, 5 Drawing Sheets

(51) Int. Cl.
*H04W 8/22* (2009.01)
*H04W 74/08* (2009.01)
*H04W 72/044* (2023.01)

(52) U.S. Cl.
CPC ...... *H04W 74/0833* (2013.01); *H04W 72/044* (2013.01)

(58) Field of Classification Search
CPC .. H04W 74/006; H04W 76/00; H04L 5/0037; H04L 5/0048; H04L 5/0044; H04L 5/0094
See application file for complete search history.

(56) References Cited

U.S. PATENT DOCUMENTS

| | | | |
|---|---|---|---|
| 9,794,924 | B2 | 10/2017 | Lee et al. |
| 10,218,422 | B2 | 2/2019 | Raghavan et al. |
| 10,701,684 | B2 | 6/2020 | Yoo et al. |
| 10,750,488 | B2 | 8/2020 | He et al. |
| 10,904,868 | B2 | 1/2021 | Lei et al. |
| 11,063,705 | B2 | 7/2021 | Chou |
| 11,108,440 | B2 | 8/2021 | Cha et al. |
| 11,424,799 | B2 | 8/2022 | Meng |
| 11,425,699 | B2 | 8/2022 | Meng |
| 11,469,866 | B2 | 10/2022 | Wu et al. |
| 11,700,612 | B2 | 7/2023 | Meng |
| 11,711,194 | B2 | 7/2023 | Meng et al. |
| 2011/0158117 | A1 | 6/2011 | Ho et al. |
| 2013/0028213 | A1 | 1/2013 | Ko et al. |
| 2015/0195795 | A1 | 7/2015 | Loehr et al. |
| 2015/0312074 | A1 | 10/2015 | Zhu et al. |
| 2016/0066345 | A1 | 3/2016 | Sun et al. |
| 2016/0323832 | A1 | 11/2016 | Love et al. |
| 2017/0012754 | A1 | 1/2017 | Sun et al. |
| 2017/0251462 | A1 | 8/2017 | Chae et al. |
| 2017/0310417 | A1 | 10/2017 | Jung et al. |
| 2017/0331573 | A1 | 11/2017 | Li |
| 2017/0332358 | A1 | 11/2017 | Park et al. |
| 2018/0048348 | A1 | 2/2018 | Gau et al. |
| 2018/0049190 | A1 | 2/2018 | Abedini et al. |
| 2018/0070274 | A1 | 3/2018 | Ode |
| 2018/0070335 | A1 | 3/2018 | Amuru et al. |
| 2018/0077685 | A1 | 3/2018 | Wu et al. |
| 2018/0115386 | A1 | 4/2018 | Shin et al. |
| 2018/0123765 | A1 | 5/2018 | Cao et al. |
| 2018/0124684 | A1 | 5/2018 | Kwon et al. |
| 2018/0139774 | A1 | 5/2018 | Ma et al. |
| 2018/0145797 | A1* | 5/2018 | Yeo ...................... H04L 1/1812 |
| 2018/0152907 | A1 | 5/2018 | Zhang et al. |
| 2018/0167932 | A1 | 6/2018 | Papasakellariou |
| 2018/0199359 | A1 | 7/2018 | Cao et al. |
| 2018/0270854 | A1 | 9/2018 | Lee et al. |
| 2018/0302191 | A1 | 10/2018 | Park et al. |
| 2018/0324770 | A1 | 11/2018 | Nogami et al. |
| 2018/0337816 | A1 | 11/2018 | Herath et al. |
| 2019/0045489 | A1 | 2/2019 | He et al. |
| 2019/0053226 | A1 | 2/2019 | Xiong et al. |
| 2019/0081657 | A1 | 3/2019 | Zeng et al. |
| 2019/0082456 | A1 | 3/2019 | Kim et al. |
| 2019/0132076 | A1 | 5/2019 | Cheng et al. |
| 2019/0158338 | A1 | 5/2019 | Herath et al. |
| 2019/0174472 | A1 | 6/2019 | Lee et al. |
| 2019/0190753 | A1 | 6/2019 | Bayesteh et al. |
| 2019/0289628 | A1 | 9/2019 | Xiong et al. |
| 2019/0312694 | A1 | 10/2019 | Jia et al. |
| 2019/0313402 | A1 | 10/2019 | Lei et al. |
| 2019/0363846 | A1 | 11/2019 | Lei et al. |
| 2019/0386783 | A1 | 12/2019 | Chou |
| 2020/0014457 | A1 | 1/2020 | Tang |
| 2020/0059322 | A1 | 2/2020 | Lei et al. |
| 2020/0059935 | A1 | 2/2020 | Qian et al. |
| 2020/0077402 | A1 | 3/2020 | Lei et al. |
| 2020/0092057 | A1 | 3/2020 | Herath et al. |
| 2020/0119958 | A1 | 4/2020 | Bayesteh et al. |
| 2020/0154442 | A1 | 5/2020 | Zhou |
| 2020/0154481 | A1 | 5/2020 | Goto et al. |
| 2020/0196335 | A1 | 6/2020 | Lei et al. |
| 2020/0213901 | A1 | 7/2020 | Yoshimoto et al. |
| 2020/0404634 | A1 | 12/2020 | He et al. |
| 2021/0029693 | A1 | 1/2021 | Meng |
| 2021/0045181 | A1 | 2/2021 | Li et al. |
| 2021/0135825 | A1 | 5/2021 | Pan et al. |
| 2021/0203465 | A1 | 7/2021 | Meng et al. |
| 2021/0211171 | A1 | 7/2021 | Meng |
| 2021/0266124 | A1 | 8/2021 | Wu et al. |
| 2022/0346087 | A1 | 10/2022 | Meng |

FOREIGN PATENT DOCUMENTS

| | | | |
|---|---|---|---|
| CN | 104488206 | | 4/2015 |
| CN | 105916207 | | 8/2016 |
| CN | 108011696 | | 5/2018 |
| CN | 108574994 A | * | 9/2018 ......... H04L 63/1416 |
| EP | 3068060 | | 9/2016 |
| WO | 2016188312 | | 12/2016 |
| WO | 2017050760 | | 3/2017 |
| WO | 2017055271 | | 4/2017 |
| WO | 201702950 | | 6/2017 |
| WO | 2017167198 | | 10/2017 |
| WO | 2017194001 | | 11/2017 |
| WO | 2017209570 | | 12/2017 |
| WO | 2017212104 | | 12/2017 |
| WO | 2018021819 | | 2/2018 |
| WO | 2018031620 | | 2/2018 |
| WO | 2018031770 | | 2/2018 |
| WO | 2018032014 | | 2/2018 |
| WO | 2018038410 | | 3/2018 |
| WO | 2018039160 | | 3/2018 |
| WO | 2018061572 | | 4/2018 |
| WO | 2018062842 | | 4/2018 |
| WO | 2018062976 | | 4/2018 |
| WO | 2018064582 | | 4/2018 |
| WO | 2018084559 | | 5/2018 |
| WO | 2018085045 | | 5/2018 |
| WO | 2018128200 | | 7/2018 |
| WO | 2018130115 | | 7/2018 |
| WO | 2018174649 | | 9/2018 |
| WO | 2019240887 | | 12/2019 |
| WO | 2019240903 | | 12/2019 |
| WO | 2019245662 | | 12/2019 |
| WO | 2019246429 | | 12/2019 |
| WO | 2020033434 | | 2/2020 |
| WO | 2020069090 | | 4/2020 |

OTHER PUBLICATIONS

"International Preliminary Report on Patentability", PCT Application No. PCT/US2019/053105, dated Apr. 8, 2021, 9 pages.
"Notice of Allowance", U.S. Appl. No. 16/387,000, dated Mar. 31, 2021, 8 pages.
"Discussion on NoMA related procedure", 3GPP TSG RAN WG1 Meeting #93, R1-1806753, May 2018.
"Foreign Office Action", KR Application No. 10-2021-7000545, dated Apr. 10, 2023, 11 pages.
"Notice of Allowance", U.S. Appl. No. 17/059,156, dated Mar. 13, 2023, 13 pages.
"Notice of Allowance", U.S. Appl. No. 17/811,747, dated Mar. 20, 2023, 13 pages.
"Extended European Search Report", EP Application No. 22159471.6, dated May 24, 2022, 9 pages.
"Notice of Allowance", U.S. Appl. No. 17/042,792, dated Apr. 12, 2022, 12 pages.

(56) References Cited

OTHER PUBLICATIONS

"Notice of Allowance", U.S. Appl. No. 17/059,131, dated May 12, 2022, 11 pages.
"Notice of Allowance", U.S. Appl. No. 17/260,862, dated May 26, 2022, 8 pages.
"Foreign Notice of Allowance", CN Application No. 201980027939.8, dated Jan. 5, 2023, 7 pages.
"Non-Final Office Action", U.S. Appl. No. 17/811,747, dated Nov. 25, 2022, 11 pages.
"Non-Final Office Action", U.S. Appl. No. 17/059,156, dated Nov. 25, 2022, 17 pages.
Georgakopoulos, et al., "Preliminary results on multi-antenna access and link enhancements", Jun. 1, 2017, 120 pages.
"3rd Generation Partnership Project; Technical Specification Group Radio Access Network; Evolved Universal Terrestrial Radio Access (E-UTRA) and NR; Multi-connectivity; Stage 2 (Release 15)", 3GPP TS 37.340 V0.0.0, Jun. 2017, 8 Pages.
"3rd Generation Partnership Project; Technical Specification Group Radio Access Network; NG-RAN; Architecture description (Release 15)", 3GPP TS 38.401 V15.0.0, Dec. 2017, 9 Pages.
"3rd Generation Partnership Project; Technical Specification Group Radio Access Network; NG-RAN; Xn application protocol (XnAP) (Release 15)", 3GPP TS 38.423 V1.0.0, Jun. 2018, 9 Pages.
"3rd Generation Partnership Project; Technical Specification Group Radio Access Network; NR; Multiplexing and channel coding (Release 15)", 3GPP TS 38.212 V15.2.0, Jun. 2018, 105 pages.
"3rd Generation Partnership Project; Technical Specification Group Radio Access Network; NR; NR and NG-RAN Overall Description; Stage 2 (Release 15)", 3GPP TS 38.300 V15.0.0, Dec. 2017, 68 Pages.
"3rd Generation Partnership Project; Technical Specification Group Radio Access Network; NR; Physical channels and modulation (Release 15)", 3GPP TS 38.211 V15.2.0, Jun. 2018, 46 pages.
"3rd Generation Partnership Project; Technical Specification Group Radio Access Network; NR; Physical layer procedures for control (Release 15)", 3GPP TS 38.213 V15.2.0, Jun. 2018, 49 pages.
"3rd Generation Partnership Project; Technical Specification Group Radio Access Network; NR; Physical layer procedures for data (Release 15)", 3GPP TS 38.214 V15.2.0, Jun. 2018, 95 pages.
"3rd Generation Partnership Project; Technical Specification Group Radio Access Network; NR; Radio Resource Control (RRC); Protocol specification (Release 15)", 3GPP TS 38.331 V0.0.1, Mar. 2017, 13 Pages.
"3rd Generation Partnership Project; Technical Specification Group Radio Access Network; Study on Integrated Access and Backhaul; (Release 15)", 3GPP TR 38.874 V0.2.1, May 2018, 19 Pages.
"Considerations on Link Rate Adaptation for NOMA", 3GPP TSG RAN WG1 Meeting #93, Busan, Korea, May 2018, 4 pages.
"Considerations on NOMA Procedures", 3GPP TSG RAN WG1 Meeting #93, Busan, Korea, May 2018, 3 pages.
"CU-DU Interface: Overall Categorization of C-Plane and U-Plane", TSG-RAN Working Group 3 meeting #95, Athens, Greece, Feb. 13-17, 2017, 9 pages.
"Discussion on Categorization of MA Schemes and Target Scenarios", 3GPP TSG RAN WG1 Meeting #86, Gothenburg, Sweden, Aug. 2016, 3 pages.
"Discussion on NOMA Procedure", 3GPP TSG RAN WG1 Meeing #93, Busan, Korea, May 2018, 4 pages.
"Discussion on NOMA Procedures", 3GPP TSG RAN WG1 Meeting #92bis, Sanya, China, Feb. 2018, 4 pages.
"Discussion on Receivers for NoMA", 3GPP TSG RAN WG1 #92 Meeting, Athens, Greece, Feb. 2018, 5 Pages.
"F1 Interface: Radio Resource Configuration Management", TSG-RAN Working Group 3 meeting #96, Hangzhou, China, May 15-19, 2017, 4 pages.
"Final Office Action", U.S. Appl. No. 16/387,000, dated Nov. 24, 2020, 13 pages.
"Final Report of 3GPP TSG RAN WG1 #86bis v1.0.0", Final Report of 3GPP TSG RAN WG1 #86bis v1.0.0, (Lisbon, Portugal), Oct. 2016, 160 pages.
"Final Report of 3GPP TSG RAN WG1 #92bis v1.0.0AN WG1 #92bis v1.0.0", Final Report of 3GPP Tsg Ran WG1 #92bis v1.0.0, (Sanya, China), Apr. 2018, 195 pages.
"Grant-Free UL Transmissions in NR", 3GPP TSG-RAN WG1 #86bis, Lisbon, Portugal, Oct. 2016, 8 pages.
"Grant-less and Non-orthogonal UL Transmissions in NR", 3GPP TSG- RAN WG1 #86, Gothenburg, Sweden, Aug. 22-26, 2016, 5 pages.
"International Preliminary Report on Patentability", Application No. PCT/US2019/031059, dated Dec. 22, 2020, 11 pages.
"International Preliminary Report on Patentability", Application No. PCT/US2019/045346, dated Nov. 13, 2020, 12 pages.
"International Preliminary Report on Patentability", Application No. PCT/US2019/029691, dated Dec. 15, 2020, 7 pages.
"International Preliminary Report on Patentability", Application No. PCT/US2019/032285, dated Dec. 15, 2020, 7 pages.
"International Preliminary Report on Patentability", Application No. PCT/US2019/038295, dated Dec. 22, 2020, 8 pages.
"International Search Report and Written Opinion", PCT Application No. PCT/US2019/029691, dated Jul. 19, 2019, 12 pages.
"International Search Report and Written Opinion", PCT Application No. PCT/US2019/038295, dated Sep. 4, 2019, 14 pages.
"International Search Report and Written Opinion", PCT Application No. PCT/US2019/031059, dated Aug. 19, 2019, 16 pages.
"International Search Report and Written Opinion", PCT Application No. PCT/US2019/045346, dated Oct. 17, 2019, 17 pages.
"International Search Report and Written Opinion", PCT Application No. PCT/US2019/053105, dated Dec. 10, 2019, 17 pages.
"International Search Report and Written Opinion", PCT Application No. PCT/US2019/032285, dated Aug. 14, 2019, 85 pages.
"Key Processing Modules at Transmitter Side for NOMA", 3GPP TSG RAN WG1 Meeting #93, Busan, Korea, May 2018, 11 pages.
"LTE; Evolved Universal Terrestrial Radio Access (E-UTRA); Medium Access Control (MAC) protocol specification (3GPP TS 36.321 version 15.8.0 Release 15)", ETSI Ts 136 321 V15.8.0 (Jan. 2020), Jan. 2020, 137 pages.
"NOMA Related Procedure", 3GPP TSG RAN WG1 Meeting #93, Busan, Korea, May 2018, 8 pages.
"Non-Final Office Action", U.S. Appl. No. 16/387,000, dated Jun. 4, 2020, 10 Pages.
"Non-Final Office Action", U.S. Appl. No. 16/427,712, dated Nov. 4, 2020, 17 pages.
"On Categorization of MA Schemes for NR", 3GPP TSG-RAN WG1 Meeting #86, Gothenburg, Sweden, Aug. 2016, 2 pages.
"Procedures related consideration to NoMA", 3GPP TSG RAN WG1 Meeting #92bis—R1-1804398, Apr. 2018, 6 pages.
"Receivers for NOMA", 3GPP TSG RAN WG1 Meeting #92, Athens, Greece, Feb. 2018, 8 Pages.
"Status Report to TSG", 3GPP TSG RAN meeting #77—RP-172105, Sep. 2017, 4 pages.
"Summary of [86-18] Email Discussion on Categorization for NR MA Schemes", 3GPP TSG RAN WG1 Meeting #86bis, Lisbon, Portugal, Oct. 10-14, 2016, 7 pages.
"Technical Specification Group Radio Access Network; NG-RAN; F1 application protocol (F1AP) (Release 15)", 3GPP TS 38.473 V15.0.0, Dec. 2017, 9 Pages.
"Typical multi-user receivers for NOMA", 3GPP TSG RAN WG1 Meeting #92, Athens, Greece, Feb. 26-Mar. 2, 2018, 14 Pages.
"UE Overheating for EN-DC", 3GPP R2-1802414, UE overheating for EN-DC, in 3GPP TSG-RAN WG2 Meeting #101, Apple Inc., Mar. 2, 2018, 3 pages.
"WF on UL Multiple Access Scheme Categorization for mMTC", 3GPP TSG RAN WG1 #86, Gothenburg, Sweden, Aug. 2016, 3 pages.
"Written Opinion", PCT Application No. PCT/US2019/045346, dated Jun. 22, 2020, 7 pages.
Klingenbrunn, Thomas et al., "Power Backoff Mechanism for Intermodulation Distortion and Harmonic Distortion", Technical Disclosure Commons; Retrieved from https://www.tdcommons.org/dpubs_series/3424, Jul. 13, 2020, 13 pages.

(56) References Cited

OTHER PUBLICATIONS

Wu, Chih-Hsiang, "Handling Overheating in a Wireless-Communication Device", Technical Disclosure Commons; Retrieved from https://www.tdcommons.org/dpubs_series/2343, Jul. 12, 2019, 22 pages.
Yuan, Yifei, "NOMA Study in 3GPP for 5G", ISTC 2018, Hong Kong, Dec. 2018, 32 pages.
Yuan, Zhifeng et al., "Blind Multi-User Detection for Autonomous Grant-Free High-Overloading MA Without Reference Signal", ZTE Corporation, South Keji Road, 55, Shenzhen, China, 508118, Dec. 7, 17, 13 pages.
"Foreign Office Action", EP Application No. 19726865.9, dated Jun. 22, 2023, 4 pages.
"Foreign Office Action", EP Application No. 19786424.2, dated Jul. 27, 2023, 9 pages.
"NOMA Related Procedure", R1-1806533—3GPP TSG RAN WG1 Meeting #93, May 2018, 8 pages.
"Considerations on Link Rate Adaptation for NOMA", 3GPP TSG RAN WG1 Meeting #93—R1-1807207, May 2018, 4 pages.
"Foreign Office Action", CN Application No. 201980050496.4, dated Oct. 17, 2023, 18 pages.
"Grant-free UL transmissions in NR", 3GPP TSG-RAN WG1 #86bis—R1-1609499, Oct. 2016, 8 pages.

\* cited by examiner

METHODS AND APPARATUS FOR AN UPLINK CONTROL CHANNEL IN NOMA ASYNCHRONOUS TRANSMISSIONS

BACKGROUND

In Fourth Generation Long Term Evolution (4G LTE), data transmission is scheduled by a base station through Downlink Control Information (DCI). One DCI format is an uplink (UL) grant, which indicates certain parameters for data transmission by a user device to the base station, such as a physical resource, modulation and coding scheme (MCS), Redundancy Version (RV), and so on. Although many transmission schemes used in 4G LTE can also be used in Fifth Generation New Radio (5G NR), some are inefficient in 5G NR.

SUMMARY

This document discloses procedures and apparatuses for an uplink control channel in non-orthogonal multiple access (NOMA) asynchronous transmissions. These techniques enable a user device to communicate with a base station over a wireless link while the user device is in a Radio Resource Control (RRC) inactive (RRC inactive) state or an RRC idle state. Generally, when the user device is in an RRC connected state, a base station is in complete control of the communications and data transmissions with the user device, e.g., the base station tells the user device how to modulate or encode the data, a size of the data, when to transmit the data, and so on. However, there are instances when the user device has data to transmit to the base station but the user device is in the RRC inactive state or the RRC idle state. Typically, the base station is not aware of which user device is transmitting the data or how the data is modulated. Consequently, the user device may convey this information to the base station using grant-free transmission or autonomous transmission.

The techniques described herein provide an additional control channel in NOMA transmissions to indicate certain information to the base station to enable the base station to detect and decode the data transmitted by the user device. For example, uplink control information (UCI) is transmitted via an uplink control channel in connection with a group user equipment identifier (group UE-ID) to enable the base station to detect and decode the UCI. After decoding the UCI based on the group UE-ID, the base station obtains information usable to distinguish the user device, such as a user equipment-specific identifier (UE-specific ID), as well as to detect and decode a data transmission from the user device on a physical uplink data channel.

This summary is provided to introduce simplified concepts of an uplink control channel in NOMA asynchronous transmissions. The simplified concepts are further described below in the Detailed Description. This summary is not intended to identify essential features of the claimed subject matter, nor is it intended for use in determining the scope of the claimed subject matter.

BRIEF DESCRIPTION OF THE DRAWINGS

Aspects of an uplink control channel in NOMA asynchronous transmissions are described with reference to the following drawings. The same numbers are used throughout the drawings to reference like features and components.

DETAILED DESCRIPTION

Figure 1:
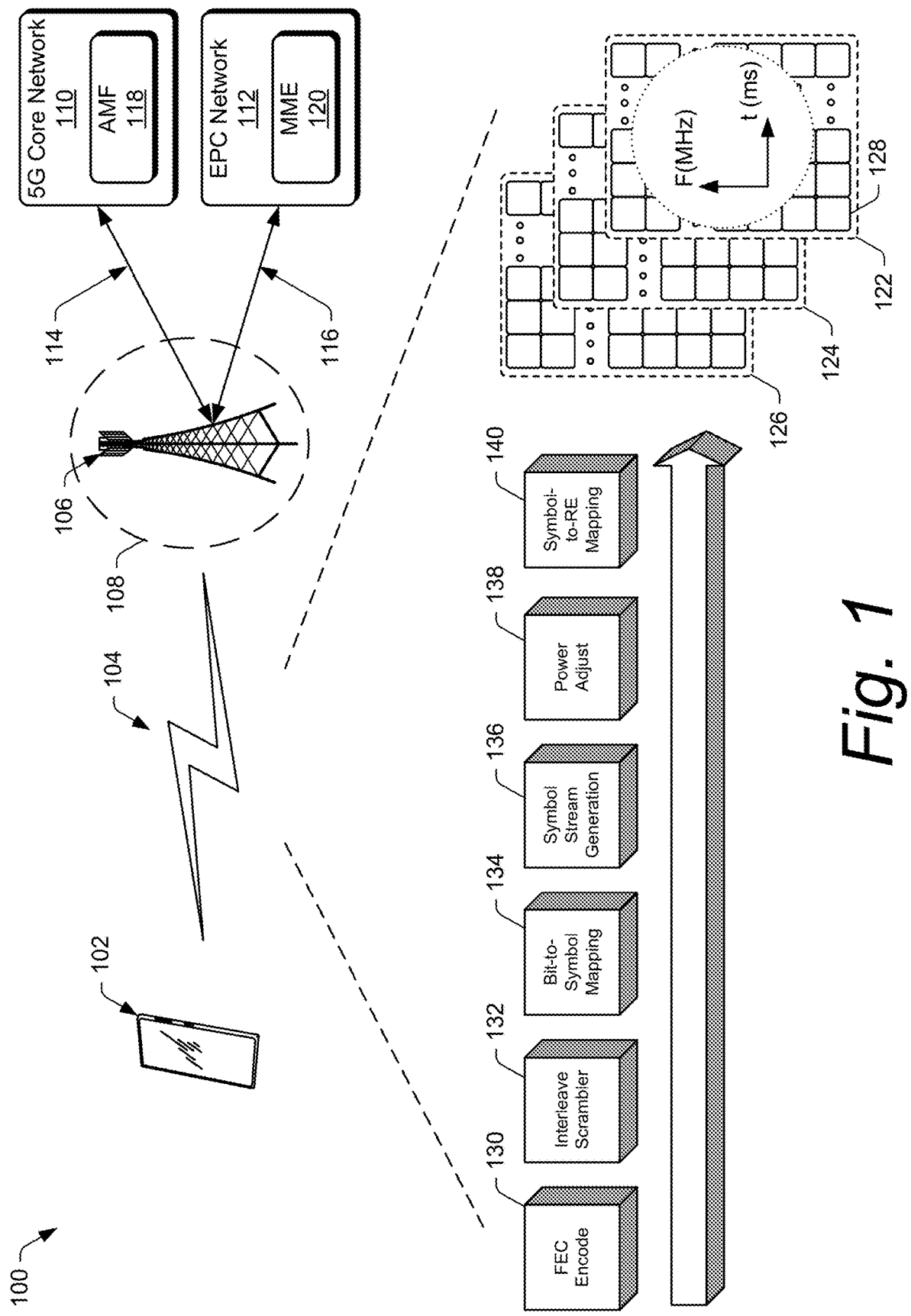
FIG. 1 illustrates an example wireless network system in which various aspects of an uplink control channel in NOMA asynchronous transmissions can be implemented.

In a Non-Orthogonal Multiple Access (NOMA) system, a user device (also referred to as a user equipment (UE)) can be configured to transmit signals with one or more multiple access (MA) signatures. By applying multi-user detection (MUD) in a base station and an MA signature in the user device, the NOMA system can increase overall system throughput. Moreover, the use of MA signatures makes MUD robust against UE signal collision, making the NOMA system suitable for asynchronous transmissions.

User devices typically perform asynchronous transmissions while in an inactive or idle state with respect to Radio Resource Control (RRC), referred to herein as RRC inactive and RRC idle states, respectively. In the RRC inactive state, the user device may have a configured UE-specific resume-Radio Network Temporary Identity (RNTI), which is usable by the base station for UE-specific control signaling. Generally, in LTE and NR, link adaptation for communications between the user device and the base station is controlled by the base station. However, in NOMA asynchronous transmissions, the user device determines link adaptive parameters independently of the base station. In an example, the user device can indicate these parameters to the base station using uplink control information (UCI). One challenge with this is for the user device to determine how to use the UCI to carry these parameters. In conventional wireless communication systems, the base station is aware of an identification of each uplink signal because a radio resource for uplink is scheduled by the base station. In NOMA asynchronous transmission, however, the radio resource is selected by the user device. This results in several challenges, including how the base station identifies the user device (e.g., a user equipment identifier (UE-ID)) with the UCI, and how the base station establishes an association between the UE-ID and a random access preamble sequence (referred to herein as a "preamble") of the transmission or between the UE-ID and a demodulation reference signal (DM-RS) of the transmission. Accordingly, the techniques described herein disclose procedures for an uplink control channel in NOMA asynchronous transmissions.

In an example, the base station assigns a group user equipment identifier (group UE-ID) to a group of user devices. When a user device in the group is in the RRC inactive or the RRC idle state, the user device selects an MA signature according to the group UE-ID for a NOMA uplink transmission. The user device then transmits the UCI and the selected MA signature according to a NOMA configuration previously received from the base station. The user device also transmits uplink data according to the selected MA signature. When the base station detects a NOMA UCI transmission in a first time-frequency resource, the base station decodes the UCI transmission according to the group UE-ID associated with the MA signature to identify information such as a user equipment-specific identifier (UE-specific ID). The base station uses the UE-specific ID to detect the uplink data transmitted in a second time-frequency resource based on the UE-specific ID. The base station can then decode the uplink data using the information in the UCI.

The group UE-ID allows for a one-to-one mapping with the UCI, which enables the user device to use the UCI to initiate data transmission to the base station from an RRC inactive or RRC idle state in which the base station is not scheduling all transmissions between the base station and the user device. Preambles and DM-RSs include a plurality of orthogonal sequences, which are orthogonal to self-cyclic shift. Generally, an LTE cell provides 64 preamble sequences for initial access. However, orthogonality is not required when using a UE-ID. Further, the group UE-ID is beneficial over a UE-specific ID because of the capability of the one-to-one mapping; it is not reasonable to combine the UE-specific ID with the preamble or the DM-RS because an amount of UE-specific IDs may be substantially larger than an available set (or number) of preambles or DM-RSs (e.g., 64 preambles compared with 200 UE-specific IDs configured in asynchronous transmission mode).

While features and concepts of the described systems and methods for an uplink control channel in NOMA asynchronous transmissions can be implemented in any number of different environments, systems, devices, and/or various configurations, aspects of an uplink control channel in NOMA asynchronous transmissions are described in the context of the following example devices, systems, and configurations.

Operating Environment

FIG. 1 illustrates an example operating environment 100 in which various aspects of an uplink control channel in NOMA asynchronous transmissions can be implemented. The operating environment 100 includes a user equipment (UE) (e.g., also referred to as a user device) 102 connecting, via a wireless link 104, to a base station 106. Although illustrated as a smart phone, the UE 102 can be implemented as any suitable computing or electronic device, such as a mobile communication device, a modem, a cellular phone, a gaming device, a navigation device, a media device, a laptop computer, a desktop computer, a tablet computer, a smart appliance, a vehicle-based communication system, and the like. The UE 102 is configured to operate over a wide range of frequencies, including cellular bands and Industrial, Scientific and Medical Radio (ISM) bands.

The base station 106 may be implemented as or include an Evolved Universal Terrestrial Radio Access Network Node B, E-UTRAN Node B, evolved Node B, eNodeB, eNB, a Next Generation Node B, gNodeB, gNB, a long-term evolution (LTE) system, an LTE-Advanced (LTE-A) system, an evolution of the LTE-A system, a 5G NR system, or the like. The base station 106 is configured to operate over a wide range of frequency bands, including ISM and cellular bands. When implemented as part of a wireless network, the base station 106 may be configured to provide or support a macrocell, microcell, small cell, picocell, wide-area network, or any combination thereof.

The UE 102 may connect to a network, such as a Long Term Evolution (LTE) or a 5G NR wireless-communication network, provided by a wireless-communication network service provider through the base station 106 via the wireless link 104. Such a network may include a series of connections to, for example, routers, servers, other base stations, or communication hardware that enable the UE 102 to communicate and exchange data with other user devices.

The wireless link 104, over which the serving cell base station 106 communicates with the UE 102, may be implemented as any suitable type of wireless link. The wireless link 104 can include a downlink of data and control information communicated from the serving cell base station 106 to the UE 102, an uplink of other data and control information communicated from the UE 102 to the serving cell base station 106, or both. The wireless link 104 may include one or more wireless links or bearers implemented using any suitable communication protocol or standard, or combination of communication protocols or standards such as 3rd Generation Partnership Project Long-Term Evolution (3GPP LTE), Fifth Generation New Radio (5G NR), and so forth. Multiple wireless links 104 may be aggregated in a carrier aggregation to provide a higher data rate for the UE 102. Multiple wireless links 104 from multiple base stations 106 may be configured for Coordinated Multipoint (CoMP) communication with the UE 102.

The base station 106 may be part of a group of base stations 106 that are collectively a Radio Access Network 108 (RAN, Evolved Universal Terrestrial Radio Access Network, E-UTRAN, 5G NR RAN or NR RAN). The base station 106 is connected to both a Fifth Generation Core 110 (5GC 110) network and an Evolved Packet Core 112 (EPC 112). Optionally or additionally, a first base station in a NR RAN may be connected to the 5GC 110 and a second base station in an E-UTRAN may be connected to the EPC 112.

The base station 106 connects, at 114, to the 5GC 110 via an NG2 interface for control-plane signaling and via an NG3 interface for user-plane data communications. The base station 106 connects, at 116, to the EPC 112 via an Si interface for control-plane signaling and user-plane data communications.

The 5GC 110 includes an Access and Mobility Management Function 118 (AMF 118) that provides control-plane functions such as registration and authentication of the UE 102, authorization, mobility management, or the like in the 5G NR network. The EPC 112 includes a Mobility Management Entity 120 (MME 120) that provides control-plane functions such as registration and authentication of the UE 102, authorization, mobility management, or the like in the E-UTRA network. The AMF 118 and the MME 120 communicate with the base station 106 in the RAN 108 and also communicate with the UE 102, via the base station 106.

As illustrated, the UE 102 transmits one or more data streams to the base station 106 via the wireless link 104. The data streams are transmitted via resources of an air interface (e.g., physical resource blocks), such as resources 122, 124, and 126. Each of the resources 122 through 126 comprises multiple resource elements, such as resource element 128, which is defined for a particular time interval (such as a time interval measured in milliseconds) and a frequency range (such as a frequency ranged measured in Megahertz (MHz)) of the air interface.

As part of the NOMA wireless communications, the UE 102 may perform multiple operations to establish a data stream. Such operations may include, for example, combinations of forward error correction and encoding 130, bit-level interleaving and scrambling 132, bit-to-symbol mapping 134, symbol stream generation 136, power adjustments 138, and symbol-to-resource element mapping 140.

Figure 2:
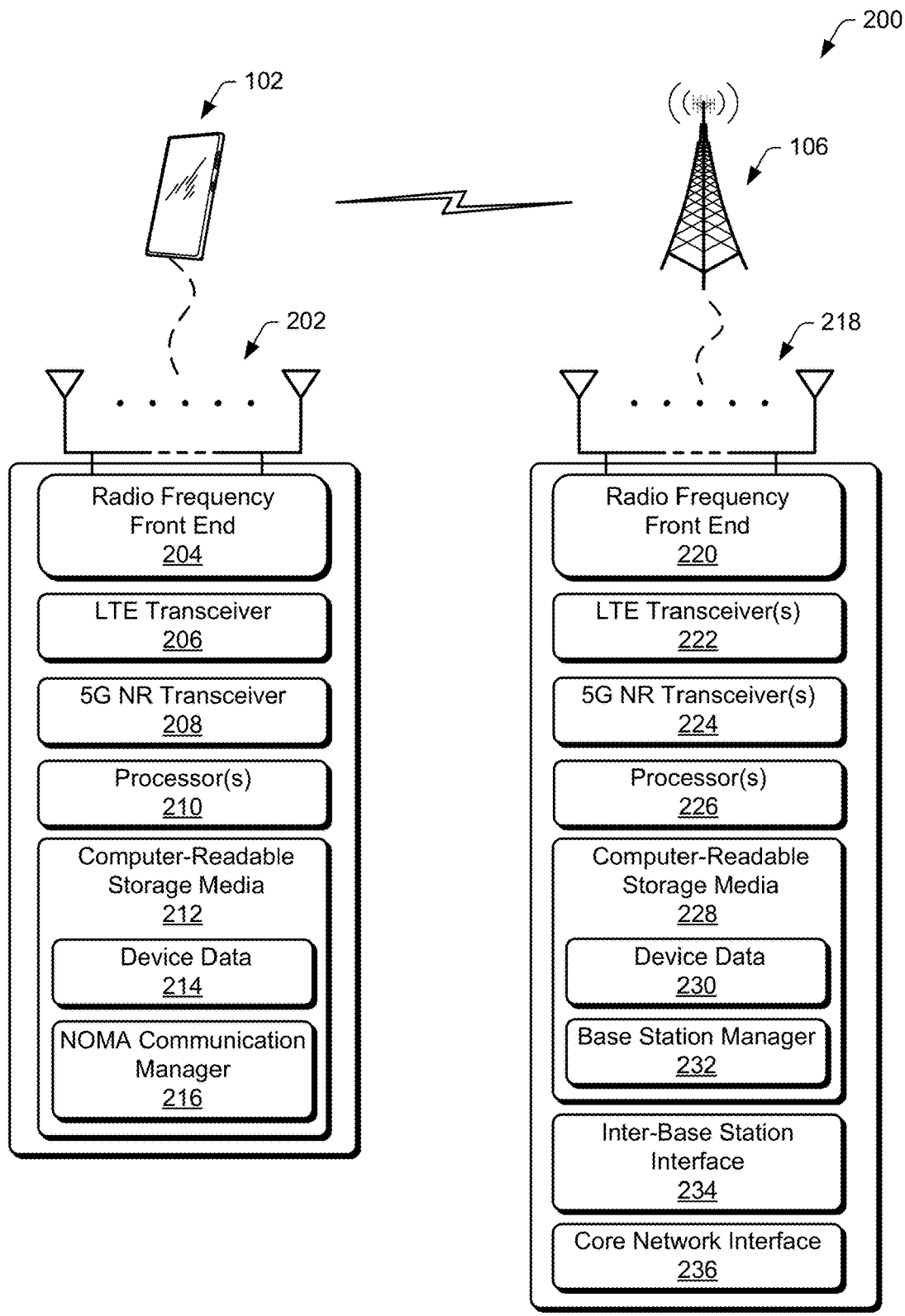
FIG. 2 illustrates an example device diagram that can implement various aspects of an uplink control channel in NOMA asynchronous transmissions.

FIG. 2 illustrates an example device diagram 200 of the UE 102 and the base station 106. The UE 102 and the base station 106 may include additional functions and interfaces that are omitted from FIG. 2 for the sake of clarity. The UE 102 includes antennas 202, a radio frequency front end 204 (RF front end 204), an LTE transceiver 206, and a 5G NR transceiver 208 for communicating with a base station 106 in the E-UTRAN. The RF front end 204 of the UE 102 can couple or connect the LTE transceiver 206 and the 5G NR transceiver 208 to the antennas 202 to facilitate various types or modes of wireless communication. The LTE transceiver 206 and the 5G NR transceiver 208 are both examples of a radio frequency transceiver.

The antennas 202 of the UE 102 may include an array of multiple antennas that are configured similar to or differently from each other. The antennas 202 and the RF front end 204 can be tuned to, and/or be tunable to, one or more frequency bands defined by the 3GPP LTE and 5G NR communication standards and implemented by the LTE transceiver 206 and/or the 5G NR transceiver 208. Additionally, the antennas 202, the RF front end 204, the LTE transceiver 206, and/or the 5G NR transceiver 208 may be configured to support beamforming for the transmission and reception of communications with the base station 106. By way of example and not limitation, the antennas 202 and the RF front end 204 can be implemented for operation in sub-gigahertz bands, sub-6 GHz bands, and/or above 6 GHz bands that are defined by the 3GPP LTE and 5G NR communication standards. Alternatively, the 5G NR transceiver 208 may be replaced with a 5G NR receiver (or transmitter) and operations describe herein as performed by the 5G NR transceiver 208 may performed by the 5G NR receiver (or transmitter).

The UE 102 also includes processor(s) 210 and computer-readable storage media 212 (CRM 212). The processor 210 may be a single core processor or a multiple core processor composed of a variety of materials, such as silicon, polysilicon, high-K dielectric, copper, and so on. The computer-readable storage media described herein excludes propagating signals. The processor 210 is configured to process communications received via the LTE transceiver 206 and the NR transceiver 208, as well as process data stored in the CRM 212 to generate communications for transmission to the base station 106 by the LTE transceiver 206 and the 5G NR transceiver 208.

The CRM 212 may include any suitable memory or storage device such as subscriber identity module (SIM), random-access memory (RAM), static RAM (SRAM), dynamic RAM (DRAM), non-volatile RAM (NVRAM), read-only memory (ROM), Flash memory, hard disk, or optical data storage device useful to store device data 214 of the UE 102. The device data 214 includes user data, multimedia data, beamforming codebooks, applications, and/or an operating system of the UE 102, which are executable by processor(s) 210 to enable user-plane communication, control-plane signaling, and user interaction with the UE 102.

CRM 212 also includes a NOMA communication manager 216 which, when execute by the processor 210, causes the UE 102 to perform functions that support an uplink control channel in NOMA asynchronous transmissions. Alternately or additionally, the NOMA communication manager 216 may be implemented in whole or part as hardware logic or circuitry integrated with or separate from other components of the UE 102. In at least some aspects, the NOMA communication manager 216 configures or acts via the RF front end 204, the LTE transceiver 206, and/or the 5G NR transceiver 208 to implement the techniques for managing NOMA communications, such as NOMA asynchronous transmissions using an uplink control channel.

The device diagram for the base station 106, shown in FIG. 2, includes a single network node (e.g., a gNodeB). The functionality of the base station 106 may be distributed across multiple network nodes and/or devices and may be distributed in any fashion suitable to perform the functions described herein. The base station 106 includes antennas 218, a radio frequency front end 220 (RF front end 220), one or more LTE transceivers 222, and/or one or more 5G NR transceivers 224 for communicating with the UE 102. The RF front end 220 of the base station 106 can couple or connect the LTE transceivers 222 and the 5G NR transceivers 224 to the antennas 218 to facilitate various types of wireless communication.

The antennas 218 of the base station 106 may include an array of multiple antennas that are configured similar to or differently from each other. The antennas 218 and the RF front end 220 can be tuned to, and/or be tunable to, one or more frequency bands defined by the 3GPP LTE and 5G NR communication standards, and implemented by the LTE transceivers 222, and/or the 5G NR transceivers 224. Additionally, the antennas 218, the RF front end 220, the LTE transceivers 222, and/or the 5G NR transceivers 224 may be configured to support beamforming, such as massive multiple input multiple output (Massive-MIMO), for the transmission and reception of communication signals with the UE 102.

The base station 106 also includes processor(s) 226 and computer-readable storage media 228 (CRM 228). The processor 226 may be a single core processor or a multiple core processor composed of a variety of materials, such as silicon, polysilicon, high-K dielectric, copper, and so on. The CRM 228 may include any suitable memory or storage device such as random-access memory (RAM), static RAM (SRAM), dynamic RAM (DRAM), non-volatile RAM (NVRAM), read-only memory (ROM), or Flash memory useful to store device data 230 of the base station 106. The device data 230 includes network scheduling data, radio resource management data, applications, and/or an operating system of the base station 106, which are executable by processor(s) 226 to enable communication with the UE 102 or functionalities of the base station 106.

The CRM 228 also includes a base station manager 232, which, when executed by the processor, causes the base station 106 to perform functions that support implementation of an uplink control channel in NOMA asynchronous transmissions. Alternately or additionally, the base station manager 232 may be implemented in whole or part as hardware logic or circuitry integrated with or separate from other components of the base station 106. In at least some aspects, the base station manager 232 allocates resources (e.g., physical resource blocks) and configures the LTE transceivers 222 and the 5G NR transceivers 224 for communication with the UE 102, as well as communication with a core network.

The base station includes an inter-base station interface 234, such as an Xn and/or X2 interface, which the base station manager 232 configures to exchange user-plane and control-plane data between another base station 106, to manage the communication of multiple base stations 106 with the UE 102. The base station 106 includes a core network interface 236 that the base station manager 232 configures to exchange user-plane and control-plane data with core network functions and entities.

Figure 3:
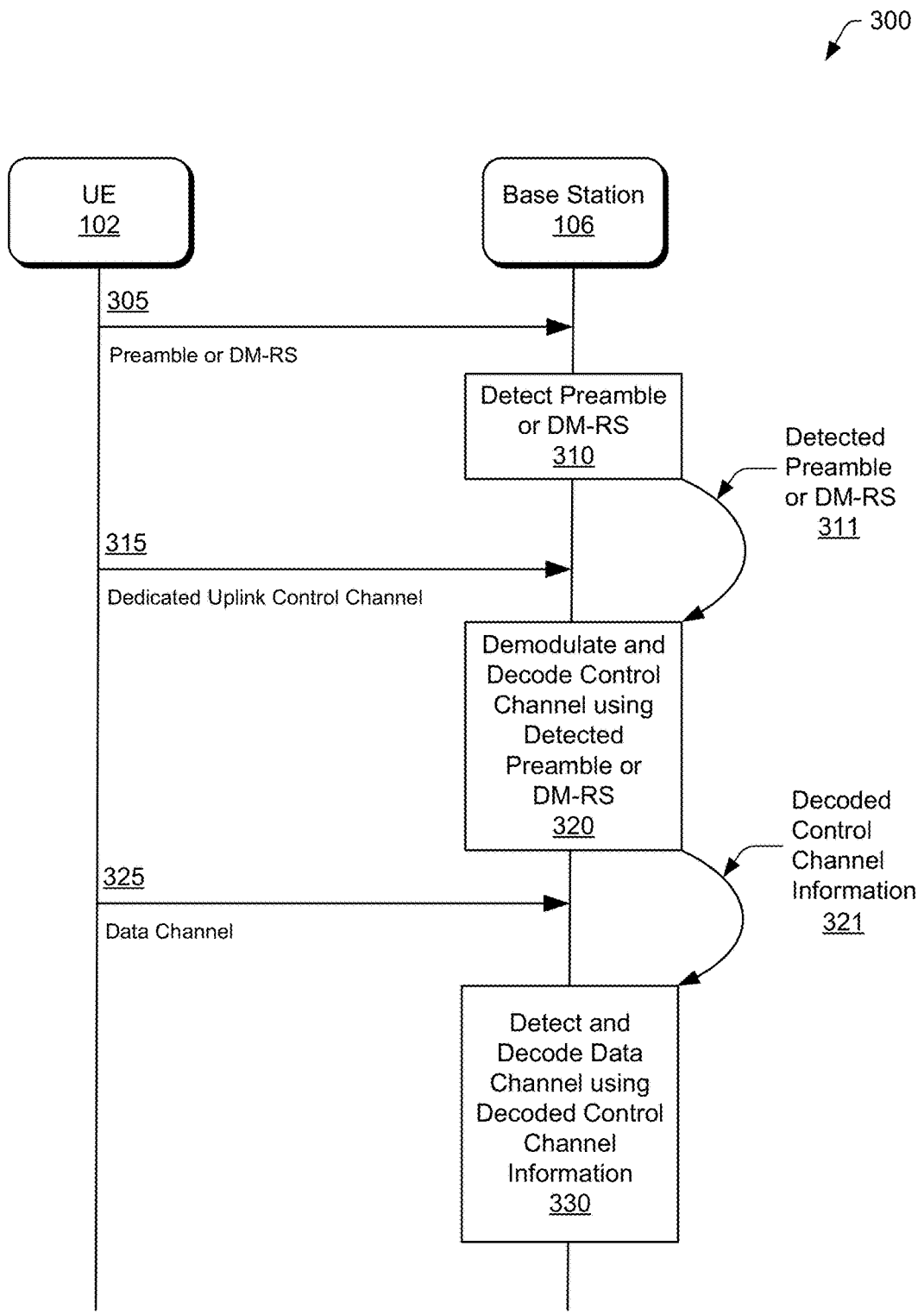
FIG. 3 illustrates an example implementation of link adaptation in accordance with aspects of the techniques described herein.

FIG. 3 illustrates an example implementation 300 of link adaptation in accordance with aspects of the techniques described herein. Link adaptation is a procedure for both the base station 106 and the UE 102 to transmit signals and uplink data in an efficient way. Using a link adaptation mechanism, a transmitting device indicates adaptive parameters for a communication link to a receiving device, such as proper time-frequency resource allocation, modulation and coding scheme, rate matching, and power control. In LTE, to achieve this goal, the base station 106 measures reference signals sent from the UE 102 or instructs the UE 102 to report a measurement of a base station-transmitted reference signal. Then, the base station 106 makes an appropriate scheduling decision.

In NOMA uplink autonomous/asynchronous transmission, however, the UE 102 is in the RRC inactive state or the RRC idle state, and the base station 106 is consequently unable to dynamically provide instructions to the UE 102 regarding control information corresponding to the uplink transmission. Thus, the UE 102 may apply a link adaptation mechanism by measuring the reference signals and determining the parameters mentioned above. In addition, the UE 102 conveys these settings to the base station 106 to enable the base station 106 to demodulate the signals and uplink data.

In one example, an uplink transmission without a grant is primarily based on RRC configuration. More specifically, resource allocation in a time and frequency domain, modulation and coding scheme (MCS), transport block size (TBS), DM-RS configuration, and so on, are explicitly configured via RRC signaling. For this type of grant-free uplink transmission, the UE 102 can transmit an uplink packet on the configured resources without waiting for activation or triggering from the base station.

Grant-free uplink NOMA transmissions can include one or more physical channels (e.g., physical control channel(s), physical data channels(s)) or signals (e.g., DM-RS) to ensure that the base station 106 can detect identification of the transmission parameters (e.g., MCS/TBS), identification of the UE 102 for purposes of decoding at the physical layer (e.g., knowledge of the MA signature), synchronization, and channel estimation. Components of the grant-free uplink NOMA transmissions can include a preamble or DM-RS that can facilitate identification of a group of user devices (at least part of the MA signature corresponding to a group UE-ID can be conveyed by the preamble or DM-RS). The components can also include a control channel to provide information about the transmission parameters and at least a part of the MA signature corresponding to the group UE-ID to the base station 106. In addition, the components can include the data channel that actually carries the encoded user data and headers.

In FIG. 3, a procedure for grant-free uplink NOMA transmission is illustrated. If the UE 102 has UL data to transmit to the base station 106 while the UE 102 is in an RRC idle state or an RRC inactive state, the UE 102 transmits a preamble or DM-RS 305, a UCI on a dedicated uplink control channel 315, and UL data on a data channel 325. These transmissions can be executed synchronously (not shown) or sequentially (as illustrated in FIG. 3) or a combination of sequentially and synchronously. In one example, the UE 102 can transmit the preamble or DM-RS 305 on the dedicated uplink control channel 315. The UE 102 uses the control channel 315 to explicitly signal physical layer transmission parameters (e.g., MCS, TBS, MA signature, transport block size) for the UL data on the data channel 325. The base station 106 detects 310 the preamble or the DM-RS 305 transmitted by the UE 102. The preamble facilitates coherent demodulation associated with a physical channel such as a physical random access channel (PRACH). When, for example, the UE 102 transmits a PRACH preamble, the UE 102 transmits with a specific pattern referred to as a signature. Rather than randomly selecting a signature from a set of signatures associated with a receiving cell, the UE 102 selects a particular signature based on the group UE-ID. The DM-RS facilitates coherent demodulation associated with transmission of a physical uplink shared channel (PUSCH) and/or a physical uplink control channel (PUCCH).

The base station 106 then uses the detected preamble or DM-RS 311 to determine certain information (e.g., resource (s), at least a part of the MA signature, group UE-ID, and so on) for the control channel 315. For instance, the base station 106 demodulates and decodes 320 the transmission signals on the control channel 315 using the detected preamble or DM-RS 311 to ascertain decoded control channel information 321 including, for example, the MCS, the TBS, the MA signature, and the UE-specific ID. The base station 106 then uses the decoded control channel information 321 to detect and decode 330 signals (e.g., UL data) transmitted on the data channel 325 by the UE 102. This procedure facilitates support of a flexible set of transmission parameters, including different MCS values, TBS values, and number of repetitions at the cost of uplink resource overhead and interference from transmission of the control channel.

Example Procedures

Figure 4:
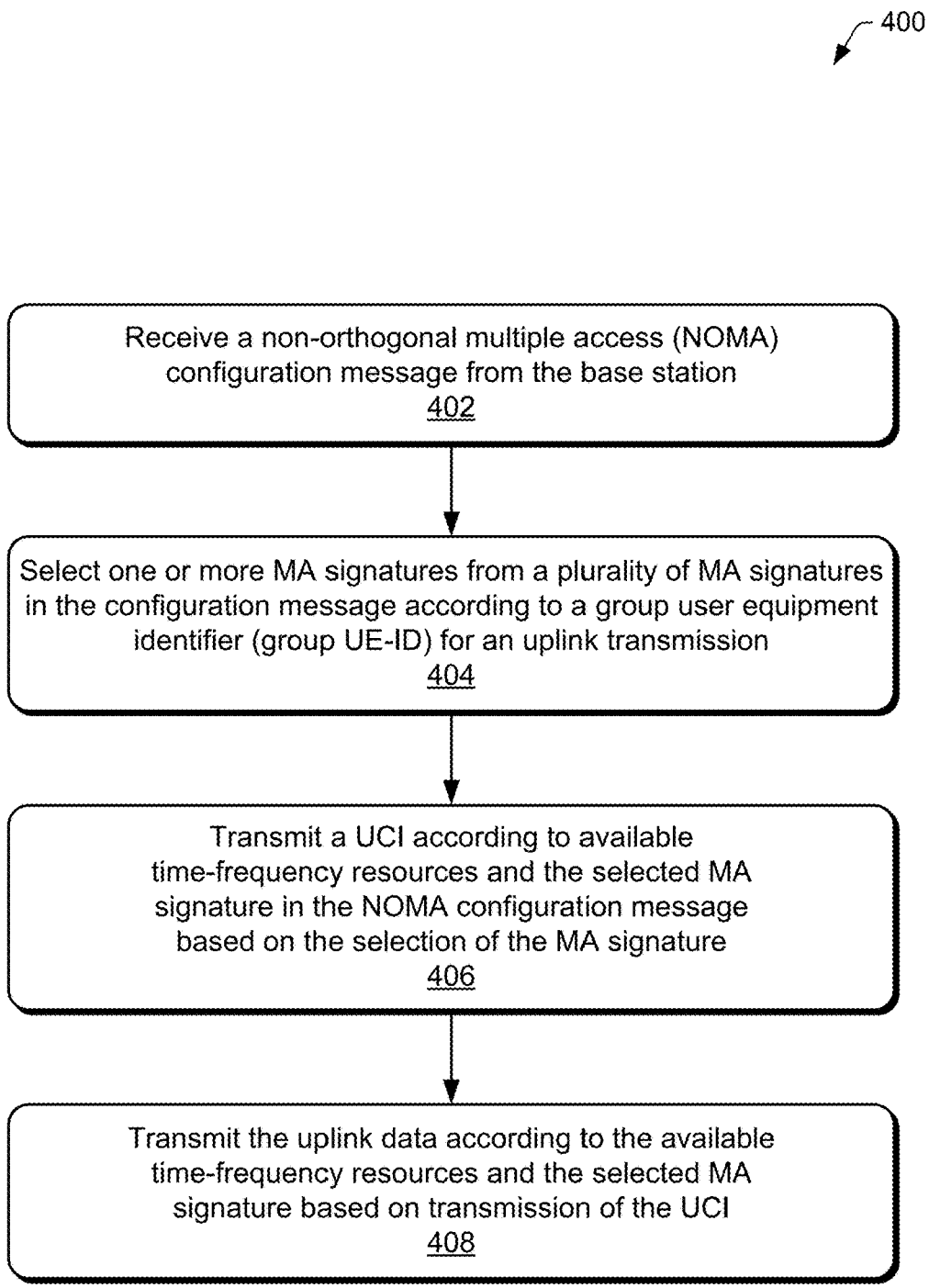
FIG. 4 depicts an example method for communicating with a base station by a user device in an inactive state or an idle state in accordance with aspects of the techniques described herein.

Example methods 400 and 500 are described with reference to FIGS. 4 and 5, respectively, in accordance with one or more aspects of uplink control channel in NOMA asynchronous transmissions. FIG. 4 depicts an example method 400 for communicating with a base station by a user device in an RRC inactive state or an RRC idle state in accordance with aspects of the techniques described herein. In aspects, the example method 400 allows the UE 102 to transmit data to the base station 106 while the UE 102 is in the RRC inactive state or the RRC idle state in a manner that enables the base station 106 to detect and decode the transmitted data.

At 402, the user device receives a NOMA configuration message from the base station. For example, the UE 102 receives a NOMA configuration message from the base station 106 via the wireless link 104. In aspects, the NOMA configuration message includes a set of MA signatures and available time-frequency resources for transmission of uplink control information (UCI) and uplink data.

At 404, when the user device is in an RRC inactive state or an RRC idle state, the user device selects an MA signature from the MA signatures in the NOMA configuration message according to a group UE-ID for an uplink transmission. Alternatively or in addition, the UE 102 may combine a preamble or DM-RS with the group UE-ID. The group UE-ID may be a subset or a segment of a UE-specific ID. Alternatively, the group UE-ID may be a derived shorter sequence of the UE-specific ID. In addition, the UE 102 may scramble the UCI with a sequence generated based on the group UE-ID. In at least one aspect, the UE 102 may join two preambles into a single preamble, wherein one of the two preambles has a one-to-one mapping with the group UE-ID.

At 406, based on the selection of the MA signature, the user device transmits the UCI according to the available time-frequency resources and the selected MA signature in the NOMA configuration message. For example, the UE 102 transmits the UCI via an uplink control channel (e.g., the dedicated uplink control channel 315 in FIG. 3). In aspects, the uplink control channel may be a physical uplink control channel (PUCCH). The UCI includes the UE-specific ID to enable the base station 106 to identify the UE 102. The UCI may also include other information such as a modulation and coding scheme (MCS), a hybrid automatic repeat request (HARQ) process ID, a transport size, and so on to enable the base station 106 to detect and decode transmission of the uplink data. In implementations, the UE 102 may encode the UCI by a Cyclical Redundancy Check (CRC) check value generated based on the group UE-ID.

At 408, the user device transmits the uplink data according to the available time-frequency resources and the selected MA signature based on transmission of the UCI. For example, the UE 102 transmits the uplink data via a physical channel (e.g., the data channel 325 in FIG. 3) to the base station 106. In aspects, the physical channel may be a physical uplink shared channel (PUSCH).

Figure 5:
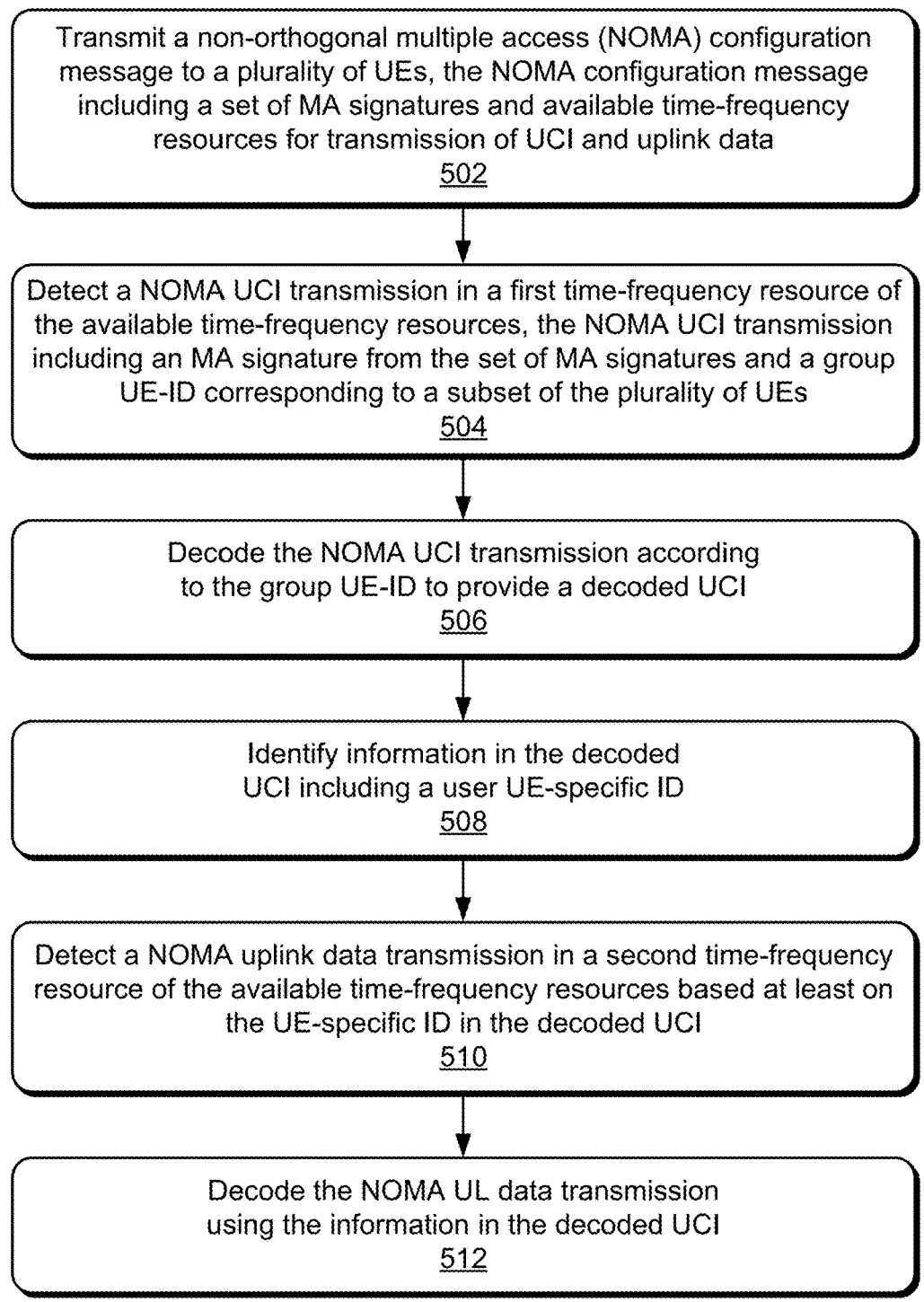
FIG. 5 depicts an example method for managing communications with user devices by a base station over a wireless link.

FIG. 5 depicts an example method 500 for managing communications with user devices by a base station over a wireless link. In aspects, the example method 500 enables the base station 106 to detect and decode transmissions from the UE 102 when the UE 102 is in the RRC inactive state or the RRC idle state.

At 502, the base station transmits a NOMA configuration message to a plurality of user devices via the wireless link. For example, the base station 106 can transmit the NOMA configuration to a plurality of user equipments 102 via the wireless link 104. In aspects, the NOMA configuration includes at least a set of MA signatures and available time-frequency resources for transmission of NOMA uplink control information (UCI) and uplink data. Each MA signature can correspond to a particular group UE-ID, such that data transmitted by a user device according to a particular MA signature indicates that the transmitting user device belongs to a particular group of devices. The NOMA configuration message establishes the group UE-ID for a group of user devices to enable a user device in the group to initiate communication with the base station when not in an RRC connected state, but rather when the user device is in an RRC inactive state or RRC idle state.

At 504, the base station detects a NOMA UCI transmission in a first time-frequency resource of the available time-frequency resources on an uplink control channel. For example, the base station 106 receives a transmission on the uplink control channel 315 using the first time-frequency resource and detects in the transmission a NOMA UCI. The NOMA UCI transmission can include an MA signature from the plurality of MA signatures in the NOMA configuration message. The NOMA UCI transmission can also include a group UE-ID that corresponds to a subset (or group) of the user devices. In an example, the base station 106 descrambles the NOMA UCI transmission according to the group UE-ID. In some aspects, the base station 106 detects a preamble or DM-RS (e.g., the preamble or DM-RS 305 from FIG. 3) associated with the group UE-ID. For example, the preamble or DM-RS can include a one-to-one mapping to the group UE-ID and the content of the UCI can carry a UE-specific ID. As described in relation to FIG. 3, the base station 106 can use the preamble or DM-RS to locate the UCI associated with the group UE-ID.

At 506, the base station decodes the NOMA UCI transmission according to the group UE-ID to provide a decoded UCI. For example, the base station 106 uses the group UE-ID to decode the NOMA UCI transmission received on the control channel (e.g., dedicated uplink control channel 315) from the UE 102. Although the base station 106 is not aware of the specific identity of the UE 102, the base station 106 is aware that the NOMA UCI transmission is received from a UE from a particular group of UEs, which the base station 106 previously assigned to the group UE-ID.

At 508, the base station identifies information in the decoded UCI including a user equipment-specific identifier (UE-specific ID). Using the group UE-ID to decode the UCI, the base station 106 ascertains the UE-specific ID that distinguishes the UE 102 from the other UEs in the group. The base station 106 can use the UE-specific ID for UE-specific control signaling when the UE 102 is in the RRC inactive state or the RRC idle state.

At 510, the base station detects a NOMA uplink data transmission in a second time-frequency resource of the available time-frequency resources based at least on the UE-specific ID in the decoded UCI. For example, the base station 106 receives a transmission on the data channel 306 and uses the UE-specific ID to detect and identify which NOMA uplink data transmission was transmitted by the UE 102.

At 512 the base station decodes the NOMA uplink data transmission using the information in the decoded UCI. For example, the base station 106 can utilize the information in the UCI, such as modulation and coding scheme, a HARQ process ID, rate matching, and power control, to decode the NOMA uplink data transmission on the data channel 315.

Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

In the following, several examples are described.

Example 1: A method for communicating with a base station by a user equipment, the method comprising: receiving a non-orthogonal multiple access configuration message from the base station, the non-orthogonal multiple access configuration message including a plurality of multiple access signatures and available time-frequency resources for transmission of uplink control information and uplink data; when the user equipment is in an RRC inactive state or an RRC idle state, selecting a multiple access signature from the plurality of multiple access signatures based on a group user equipment identifier for an uplink transmission, the group user equipment identifier corresponding to a group of user equipments that includes the user equipment; based on the selecting of the multiple access signature, transmitting the uplink control information according to the available time-frequency resources and the selected multiple access signature from the non-orthogonal multiple access configuration message; and based on the transmitting of the uplink control information, transmitting the uplink data using the available time-frequency resources and the selected multiple access signature.

Example 2: The method of example 1, wherein the group user equipment identifier is a subset or segment of a user equipment-specific identifier assigned to the user equipment.

Example 3: The method of any one of the preceding examples, wherein: the transmitting of the uplink control information includes transmitting the uplink control information on a physical uplink control channel.

Example 4: The method of any one of the preceding examples, wherein the transmitting of the uplink data includes transmitting the uplink data on a physical uplink shared channel.

Example 5: The method of any one of the preceding examples, further comprising: generating a cyclical redundancy check (CRC) check value using the group user equipment identifier; and encoding the uplink control information with the check value.

Example 6: The method of any one of the preceding examples, wherein the uplink control information comprises a user equipment-specific identifier assigned to the user equipment, a modulation and coding scheme, and a HARQ process identifier.

Example 7: The method of any one of the preceding examples, further comprising scrambling the uplink control information with a sequence generated based on the group user equipment identifier.

Example 8: The method of any one of the preceding examples, further comprising joining two preambles into a single preamble, wherein one of the two preambles has a one-to-one mapping with the group user equipment identifier.

Example 9: The method of any one of the preceding examples, further comprising, based on the selecting of the multiple access signature, transmitting a preamble or demodulation reference signal associated with the group user equipment identity.

Example 10: A user equipment comprising a processor and memory system to implement a communication manager application configured to manage communications with a base station, the communication manager application configured to perform the method of any one of the preceding examples.

Example 11: A method for managing communications with user equipments by a base station over a wireless link, the method comprising: transmitting a non-orthogonal multiple access configuration message to a plurality of user equipments using the wireless link, the NOMA configuration message including a plurality of multiple access signatures and available time-frequency resources for transmission of a NOMA uplink control information and uplink data; detecting a non-orthogonal multiple access uplink control information transmission in a first time-frequency resource of the available time-frequency resources, the non-orthogonal multiple access uplink control information transmission including a multiple access signature from the plurality of multiple access signatures and a group user equipment identifier, the group user equipment identifier corresponding to a subset of the plurality of user equipments; decoding the non-orthogonal multiple access uplink control information transmission according to the group user equipment identifier to provide a decoded uplink control information; identifying information in the decoded uplink control information including a user equipment-specific identifier; detecting a non-orthogonal multiple access uplink data transmission in a second time-frequency resource of the available time-frequency resources based at least on the user equipment-specific identifier in the decoded uplink data transmission; and decoding the non-orthogonal multiple access uplink data transmission using the information in the decoded uplink control information.

Example 12: The method of example 11, further comprising de-scrambling the non-orthogonal multiple access uplink control information according to the group user equipment identifier.

Example 13: The method of example 11 or example 12, wherein the non-orthogonal multiple access configuration message indicates an association between the plurality of multiple access signatures and the group user equipment identifier.

Example 14: The method of any one of examples 11 to 13, further comprising assigning the group user equipment identifier to a subset of the plurality of user equipments.

Example 15: The method of any one of examples 11 to 14, wherein the group user equipment identifier is derived from a UE-specific identifier assigned to the user equipment.

Example 16: The method of any one of examples 11 to 15, further comprising: receiving the non-orthogonal multiple access uplink control information on a physical uplink control channel.

Example 17: The method of any one of examples 11 to 16, further comprising: receiving the non-orthogonal multiple access uplink data transmission on a physical uplink shared channel.

Example 18: The method of any one of examples 11 to 17, wherein the decoded uplink control information comprises a user equipment-specific identifier assigned to the user equipment, a modulation and coding scheme, and a HARQ process identifier.

Example 19: The method of any one of examples 11 to 18, further comprising: detecting a preamble or demodulation reference signal, transmitted by the user equipment, associated with the group user equipment identifier; and using the preamble or demodulation reference signal to locate the uplink control information.

Example 20: A based station comprising a processor and memory system to implement a base station manager application configured to manage communications with a user equipment, the base station manager application configured to perform the method of any one of examples 11 to 19.

Although aspects of an uplink control channel in NOMA asynchronous transmissions have been described in language specific to features and/or methods, the subject of the appended claims is not necessarily limited to the specific features or methods described. Rather, the specific features and methods are disclosed as example implementations of an uplink control channel in NOMA asynchronous transmissions, and other equivalent features and methods are intended to be within the scope of the appended claims. Further, various different aspects are described, and it is to be appreciated that each described aspect can be implemented independently or in connection with one or more other described aspects.

The order in which the method blocks of FIGS. 4-5 are described is not intended to be construed as a limitation, and any number of the described method blocks can be combined in any order to implement a method, or an alternate method.

When an ordinal number (such as "first", "second", "third" and so on) is used as an adjective before "configuration message", "PUCCH", "logical channel", "physical channel", or "MA channel", that ordinal number is used to indicate a particular feature, such as to distinguish that particular feature from another feature that is described by the same term or by a similar term. For example, a "first widget" may be so named merely to distinguish it from, e.g., a "second widget."

What is claimed is:

1. A method for communicating with a base station by a user equipment, the method comprising:
   receiving a non-orthogonal multiple access configuration message from the base station, the non-orthogonal multiple access configuration message including a plurality of multiple access signatures and available time-frequency resources for uplink transmissions;
   deriving a group user equipment identifier (a group UE-ID) from at least a user equipment-specific identifier (a UE-specific ID) assigned to the user equipment, the group UE-ID corresponding to a group of user equipments that includes the user equipment;
   while operating in a radio resource control inactive (RRC inactive) state or a radio resource control idle (RRC idle) state, selecting, for at least a first uplink transmission, a multiple access signature from the plurality of multiple access signatures;
   transmitting, using an uplink control channel, uplink control information in the first uplink transmission using a first time-frequency resource of the available time-frequency resources and the selected multiple access signature; and
   transmitting, using an uplink data channel, uplink data in a second uplink transmission using a second time-frequency resource of the available time-frequency resources and at least based on the uplink control information.

2. The method of claim 1, wherein the deriving the group UE-ID comprises:
   selecting a subset or segment of the UE-specific ID as the group UE-ID.

3. The method of claim 1, wherein transmitting the uplink control information further comprises:
   scrambling the uplink control information using the group UE-ID; and
   transmitting the scrambled uplink control information in the first uplink transmission.

4. The method as recited in claim 3, wherein scrambling the uplink control information using the group UE-ID further comprises:
   generating a sequence based on the group UE-ID; and
   scrambling the uplink control information with the generated sequence.

5. The method of claim 1, further comprising:
   selecting, by the user equipment, one or more link adaptive parameters for transmitting the uplink data; and
   indicating the one or more link adaptive parameters in the uplink control information.

6. The method of claim 5, wherein transmitting the uplink data in the second uplink transmission further comprises:
   transmitting the second uplink transmission using the link adaptive parameters.

7. The method as recited in claim 1, further comprising:
   including, in the uplink control information, at least one of:
      the UE-specific ID assigned to the user equipment;
      a modulation and coding scheme parameter;
      a rate matching parameter;
      a power control parameter;
      a hybrid automatic repeat request (HARQ) process identifier; or
      a transport size.

8. The method as recited in claim 1, further comprising:
   transmitting, on the uplink control channel and as part of the first uplink transmission, a random access preamble sequence or demodulation reference signal associated with the group UE-ID.

9. The method as recited in claim 8, further comprising:
   generating the random access preamble sequence by joining two random access preamble sequences into a single preamble, wherein one of the two random access preamble sequences has a one-to-one mapping with the group UE-ID.

10. A method for managing communications with user equipments by a base station over a wireless link, the method comprising:
    establishing a group user equipment-identifier (a group UE-ID) for a subset of user equipments included in a plurality of user equipments by deriving the group UE-ID from at least a user equipment-specific identifier (a UE-specific ID) assigned to a user equipment included in the plurality of user equipments;
    transmitting a non-orthogonal multiple access configuration message to the plurality of user equipments using the wireless link, the non-orthogonal multiple access configuration message including a plurality of multiple access signatures and available time-frequency resources for uplink transmissions from the plurality of user equipments;
    detecting a non-orthogonal multiple access uplink transmission in a first time-frequency resource of the available time-frequency resources and based on the group UE-ID, the non-orthogonal multiple access uplink transmission including a multiple access signature from the plurality of multiple access signatures and uplink control information; and
    receiving a non-orthogonal multiple access uplink data transmission, from the user equipment, in a second time-frequency resource of the available time-frequency resources based at least on the uplink control information.

11. The method as recited in claim 10, wherein the deriving the group UE-ID comprises:
    selecting a subset or segment of the UE-specific ID as the group UE-ID.

12. The method as recited in claim 10, further comprising:
    descrambling the uplink control information using the group UE-ID.

13. The method as recited in claim 10, further comprising assigning the group UE-ID to a subset of the plurality of user equipments.

14. The method as recited in claim 10, further comprising:
    obtaining, from the uplink control information, at least one of:
       the UE-specific ID assigned to the user equipment;
       a modulation and coding scheme parameter;
       a rate matching parameter;
       a power control parameter;
       a hybrid automatic repeat request (HARQ) process identifier; or
       a transport size.

15. The method as recited in claim 10, wherein detecting the non-orthogonal multiple access uplink transmission in the first time-frequency resource and based on the group UE-ID further comprises:
    detecting a preamble or demodulation reference signal, transmitted by the user equipment, associated with the group UE-ID; and using the preamble or demodulation reference signal to locate the uplink control information.

16. A user equipment comprising:
a processor; and
a memory system storing processor-executable instructions that, responsive to execution by the processor, direct the user equipment to perform operations comprising:
receiving a non-orthogonal multiple access configuration message from a base station, the non-orthogonal multiple access configuration message including a plurality of multiple access signatures and available time-frequency resources for uplink transmissions;
deriving a group user equipment identifier (a group UE-ID) from at least a user equipment-specific identifier (a UE-specific ID) assigned to the user equipment, the group UE-ID corresponding to a group of user equipments that includes the user equipment;
while operating in a radio resource control inactive (RRC inactive) state or a radio resource control idle (RRC idle) state, selecting, for at least a first uplink transmission, a multiple access signature from the plurality of multiple access signatures;
transmitting, using an uplink control channel, uplink control information in the first uplink transmission using a first time-frequency resource of the available time-frequency resources and the selected multiple access signature; and
transmitting, using an uplink data channel, uplink data in a second uplink transmission using a second time-frequency resource of the available time-frequency resources and at least based on the uplink control information.

17. The user equipment as recited in claim 16, wherein the memory system stores additional processor-executable instructions that, responsive to execution by the processor, direct the user equipment to perform further operations comprising:
scrambling the uplink control information using the group UE-ID; and
transmitting the scrambled uplink control information in the first uplink transmission.

18. The user equipment as recited in claim 16, wherein the memory system stores additional processor-executable instructions that, responsive to execution by the processor, direct the user equipment to perform operations comprising:
deriving the group UE-ID by selecting a subset or segment of the UE-specific ID as the group UE-ID.

19. The user equipment as recited in claim 16, wherein the memory system stores additional processor-executable instructions that, responsive to execution by the processor, direct the user equipment to perform operations comprising:
selecting, by the user equipment, one or more link adaptive parameters for transmitting the uplink data; and
indicating the one or more link adaptive parameters in the uplink control information.

20. The user equipment as recited in claim 16, wherein the memory system stores additional processor-executable instructions that, responsive to execution by the processor, direct the user equipment to perform operations comprising:
transmitting, on the uplink control channel and as part of the first uplink transmission, a random access preamble sequence or demodulation reference signal associated with the group UE-ID.

* * * * *

UNITED STATES PATENT AND TRADEMARK OFFICE
CERTIFICATE OF CORRECTION

PATENT NO. : 11,910,391 B2
APPLICATION NO. : 17/265170
DATED : February 20, 2024
INVENTOR(S) : Kao-Peng Chou Page 1 of 1

It is certified that error appears in the above-identified patent and that said Letters Patent is hereby corrected as shown below:

In the Claims

Column 13, Lines 14-15, Claim 1: After "inactive" before "state", delete "(RCC inactive)" add --(RCC_inactive)--
Column 13, Lines 15-16, Claim 1: After "idle" before "state", delete "(RCC idle)" add --(RCC_idle)--
Column 15, Line 20, Claim 16: Before "state", delete "(RCC inactive)" add --(RCC_inactive)--
Column 15, Line 21, Claim 16: Before "state", delete "(RCC idle)" add --(RCC_idle)--

Signed and Sealed this
Nineteenth Day of March, 2024

Katherine Kelly Vidal
*Director of the United States Patent and Trademark Office*